F. D. EVERETT.
SLACK ADJUSTER.
APPLICATION FILED JULY 31, 1917.

1,274,865.

Patented Aug. 6, 1918.

INVENTOR:
Francis Dewey Everett
by Macleod, Calver, Copeland & Dike
Attys.

UNITED STATES PATENT OFFICE.

FRANCIS DEWEY EVERETT, OF SARANAC LAKE, NEW YORK.

SLACK-ADJUSTER.

1,274,865.  Specification of Letters Patent.  Patented Aug. 6, 1918.

Application filed July 31, 1917. Serial No. 183,814.

*To all whom it may concern:*

Be it known that I, FRANCIS DEWEY EVERETT, a citizen of the United States, residing at Saranac Lake, in the county of Essex and State of New York, have invented a certain new and useful Improvement in Slack-Adjusters, of which the following is a specification, reference being had therein to the accompanying drawings.

My invention relates to a slack adjuster mechanism for taking up the wear between two friction surfaces, such as brakes on an automobile or a friction driving mechanism where, when the tension is released there must always be the same amount of clearance, and where the movement of the operating device is limited, as in the case of the brake pedal of an automobile.

The invention is an improvement on the device shown and described in an application filed by me April 11, 1917, Serial No. 161,310, allowed June 22nd, 1917.

The invention as shown in the drawings, and as described herein is embodied in a slack adjuster applied to brakes of an automobile, but it will be understood that the invention is adapted for application to and use in connection with other classes of apparatus or mechanism.

The invention will be fully understood from the following description, taken in connection with the accompanying drawings, and the novel features thereof are pointed out and clearly defined in the claims at the end of the specification.

In the drawings, Figure 1 is a longitudinal section of an automobile chassis or frame with my slack adjuster mechanism combined therewith.

Figure 1:
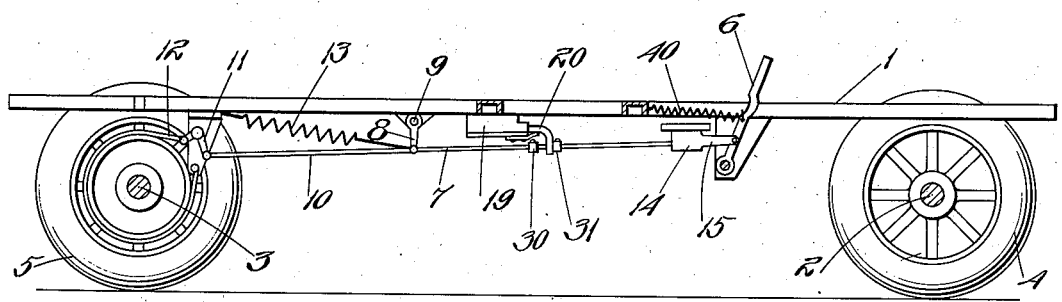

Referring now to the drawings, 1 is the frame of an automobile which may be of any ordinary construction; 2 and 3 are respectively the front and rear axles, and 4 and 5 are respectively the front and rear wheels. 6 is the foot pedal and 7 the connecting rod which connects the brake pedal 6 with the lever 8 on the cross rod 9 connected with the frame. The cross rod 9 is connected through rods or connections 10 with the angle levers 11 which are connected with the brake band 12 in the usual and well known way. Only one of said rods 10 and levers 11 is shown in the drawings. A spring 13 acts to release the brake when the foot pedal is released, and a spring 40 serves to return the foot pedal 6 to its normal position when it is released.

The intermediate mechanism connecting the connecting rod 7 with the foot pedal 6 may be of the same general character as shown and described in said previous application and which is herein shown and described merely for the purpose of clearly understanding the present invention.

A box or casing 14 has two forwardly extending arms 15 (only one of which is shown in the drawings) between which extends the foot brake pedal 6. The said pedal is pivotally connected with said arms 15.

Figure 2:
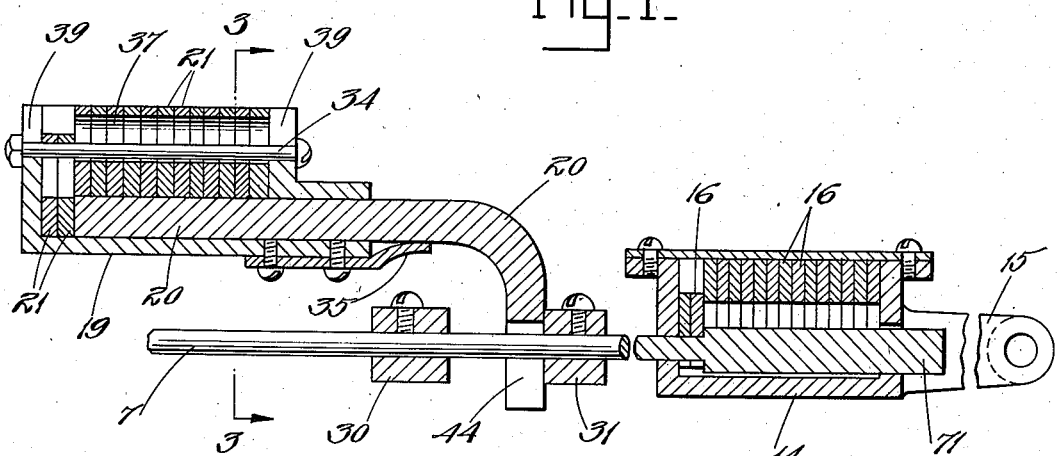
Fig. 2 is a longitudinal section on an enlarged scale showing the slack adjuster mechanism detached and some of the connecting parts partly broken away.

The connecting rod 7 has an enlarged end 71 preferably of square shape in cross section which is located in the lower part of the box or casing 14 and moves in a lengthwise direction, one end of the box having an opening for the enlarged portion 71 to slide through, and the other end of the box having a smaller opening for the rod 7. Within the box 14 are located a series of separate plates or washers 16 each of which has a forked lower end, the spaces between the branches of the fork being sufficient to loosely receive the rod 7. The plates or washers 16 are normally supported on the enlarged head 71 of the rod 7, but whenever the box 14 moves with relation to the rod 7 so that there is a space between the shoulder formed by the enlarged head 71 of the rod and the adjacent end of the box, as shown in Fig. 2, if the movement is enough to afford sufficient space, one or more of the plates 16 will be released and drop down on to the smaller portion of the rod 7, as shown in Fig. 2, the number of plates which drop down being according to the space, thus preventing the rod from being moved back again with relation to the box, and the shoulder on the enlarged head of the rod will be engaged by one of said washers or plates instead of by the rear end of the box.

A second box or casing 19 is provided which is made fast to the frame. Said box may be formed with a flange 41 having bolt holes 42 to enable the box to be secured to the frame. A slide bar 20 is mounted in the lower part of said box 19 and extends through an opening in the forward end thereof and is adapted to have a sliding movement in said box. A plurality of plates or washers 21 are strung on a rod 34 which rests in slots 39 in the ends of the box, said washers being formed with slots 37 of sufficient height so that when the slide rod or bar 20 is moved forward, that is, toward the right as viewed in Fig. 2, one or more of the washers 21, as the case may be according to the distance that the slide bar is moved forward, may drop down behind the rear end of said slide bar to form a stop to prevent the return of the slide bar to the left.

A spring 35 which is secured to the box 19 bears against the said slide bar 20 and acts as a sort of brake or check to prevent longitudinal movement of the slide bar 20, due to vibration or any similar slight cause, but does not prevent the movement of the bar when acted upon positively. The forward end of the slide bar 20 is bent down and forked or slotted, thereby forming a slot or opening 44 through which passes the rod 7. Mounted fast to the rod 7 are two stops 30 and 31, one on either side of the downwardly projecting end of the slide bar 20, said stops being spaced apart from each other a sufficient distance so that there is a clearance space sufficient to allow for the normal movement of the connecting rod without moving the slide bar; that is, at the end of the forward stroke of the connecting rod, when the pedal is depressed to set the brake, the stop 30 will be in engagement with the rear face of the downwardly extending end of the slide bar, and at the end of the rearward or returning movement of the connecting rod when the brake is released, the stop 31 will engage the front face of the downwardly extending end of the slide bar.

The stops are so spaced apart and adjusted on the connecting rod that in the normal movement of the connecting rod in setting the brakes and releasing them, the said stops will merely come into contact with said slide bar, without moving it.

When, however, the wear on the brake surfaces requires a longer movement of the rod 7 to set the brake, this will cause the rod 7 to move to the right as viewed in Fig. 2 enough more than the normal length of the stroke to make up for the wear, and as the stop 30 will engage the slide bar when the connecting rod is moved its normal distance, any continued movement beyond the normal distance, will cause the stop to move the slide bar to the right a distance equal to the excess or additional movement of the connecting rod. If this additional movement is sufficient to move the slide bar a distance equal to the thickness of one of the washers or plates 21, one of said plates will drop down behind the end of the slide bar.

When the foot is released from the pedal so that the spring 40 is operative to restore the pedal to its normal position, thereby carrying back with it the arms 15 and the case or box 14, and the spring 13 is also operative to pull back the connecting rod 7, the box 14 will move back to its original normal position, but the connecting rod 7 will be moved back as much short of its original normal position as the thickness of the plate 21 which has dropped down in behind the slide bar 20. This will leave a corresponding space between the shoulder at the rear end of the enlarged portion or head 71 and the rear wall of the box 14 equal in length to the space which has been filled by the dropping of the plate or plates 21 in the box 19. This will allow one or more plates 16 in the box 14 to drop down on to the rod 7 behind the shoulder of the enlarged head 71 so that when the pedal is again depressed to apply the brake, the box 14 will be carried forward and thereby immediately cause the rod 7 to move forward. The movement now will at first be the regular normal length of stroke but under continued wear, it will gradually be slightly increased, until the slack is sufficient for the amount to be taken up by another one of the washers.

Figure 5:
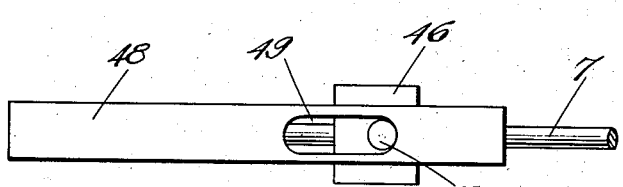
Fig. 5 is a plan view of the modified form shown in Fig. 4.
Figure 4:
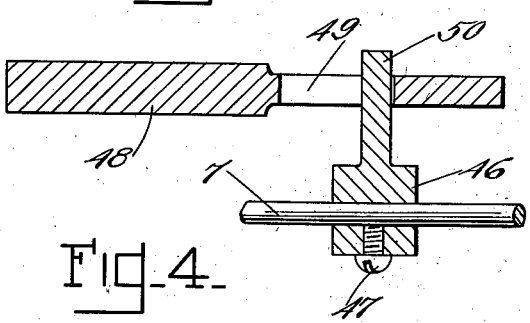
Fig. 4 is a longitudinal sectional view showing a modified form of mechanism embodying the invention, detached.
Figure 3:
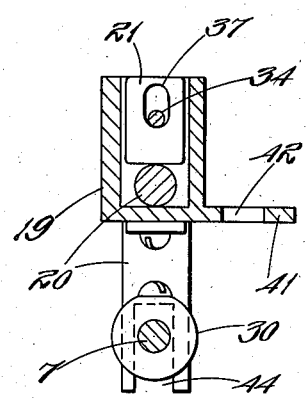
Fig. 3 is a section on line 3—3 of Fig. 2.

In the modification shown in Figs. 4 and 5, instead of having two stops fixedly mounted on the rod 7 a certain distance apart from each other, and forming the slide bar with a downwardly extending arm, having a slot through which the connecting rod loosely passes, there is provided a single stop 46 rigidly secured to the connecting rod 7, as by a screw 47, and forming the slide bar 48 with an elongated slot 49 which is engaged by a finger 50 projecting from the stop 46. The said slot 49 is of just the right length so that as the connecting rod moves in its normal length of stroke, it will alternately engage the opposite ends of said slot. When, however, there is sufficient wear for the connecting rod to increase its length of stroke in setting the brake, it will cause the slide bar to move forward a distance equal to the increased length of the stroke, and when the wear becomes enough so that the increased movement of the connecting rod moves the slide bar a distance equal to the thickness of one of the plates 21, the said plate will drop down behind the rear end of the slide bar and the slack will be taken up as already described.

Thus the normal length of stroke of the connecting rod in setting or releasing the brakes in the first form of device described will be regulated by the distance between the stops 30 and 31, and in the modified form of device as shown in Figs. 4 and 5, the distance will be regulated by the length of the slot 49. The method of action is the same in both cases.

What I claim is:

1. A slack adjuster to automatically take up the wear between two friction surfaces, comprising a reciprocatable member or rod connected with one of said friction surfaces, means for reciprocating said rod to move the friction surface connected therewith toward and from the other friction surface, a stationary box or casing, a member which is slidable within said box or casing, a loose connection between said slide member and said connecting rod whereby said rod is permitted a predetermined range of movement with relation to said slide member, means connected with said rod having portions which alternately engage different portions of said slide member at the opposite ends of the normal stroke of said connecting rod, one of which engaging surfaces moves said slide member in an outward direction from the casing whenever said connecting rod moves on its forward stroke more than its normal distance, and a series of separate plates or washers within said casing which are normally supported upon said slide member and which are severally adapted to drop down behind the end of said slide member whenever said slide member is moved out from under any one or more of said plates or washers, and thereby to limit the return movement of said slide member.

2. A slack adjuster to automatically take up the wear between two friction surfaces, comprising a reciprocatable rod, connected with one of said friction surfaces, means for reciprocating said rod to move the friction surface connected therewith toward and from the other friction surface, a stationary box or casing, a member which is slidable within said box or casing, a loose connection between said slidable member and said reciprocatable rod whereby said rod is permitted a predetermined range of movement with relation to said slidable member, means connected with said rod having portions which alternately engage different portions of said slidable member at the opposite ends of the normal stroke of said rod, one of which engaging surfaces moves said slidable member in the box in an outer direction whenever said rod moves on its forward stroke more than its normal distance, a series of separate plates or washers within said box or casing which are normally supported upon said slidable member in said casing and which are severally adapted to drop down behind the end of said slidable member whenever said slidable member is moved out from under any one or more of said plates or washers, and thereby to limit the return movement of said slidable member therein, and a spring brake which engages the said slidable member to prevent accidental sliding movement thereof.

3. A slack adjuster to automatically take up the wear between two friction surfaces in which one of the friction surfaces is movable toward and from the other, and is provided with a connecting rod and mechanism for actuating said rod to move the friction surface connected therewith toward and from the other friction surface, said slack adjuster comprising a stationary device, a slide member connected with the stationary device, a loose connection between said slide member and said connecting rod whereby said connecting rod is permitted a predetermined range of movement with relation to said slide member, means connected with said rod having faces which are respectively adapted to be brought into contact with said slide member at the opposite ends of the normal stroke of said connecting rod without actuating said slide member, the surface on said connecting rod which engages said slide member on the stroke which applies the brake, actuating said slide member in an outward direction with relation to said fixed member whenever the said friction applying stroke of the connecting rod exceeds its normal length, and stop mechanism controlled by said slide member in such manner that when said slide member is moved outward with relation to said fixed member, said stop mechanism will automatically move to a position which prevents a return movement of said slide member in relation to said fixed member.

4. A slack adjuster to automatically take up the wear between two friction surfaces, in which one of the friction surfaces is movable toward and from the other, and is provided with a connecting rod and mechanism for actuating said rod to move the friction surface connected therewith toward and from the other friction surface, said slack adjuster comprising a stationary device, a slide member connected with the stationary device, a loose connection between said slide member and said connecting rod whereby said connecting rod is permitted a predetermined range of movement with relation to said slide member, engaging means connected with said rod which respectively are barely brought into engagement with said slide member at the opposite ends of the normal stroke of said connecting rod, the surface on said connecting rod which engages said slide member on the stroke which applies the brake, causing said slide member to be moved with relation to said fixed member whenever the said friction applying stroke of the connecting rod exceeds its normal length, stop mechanism controlled by said slide member in such manner that when said slide member is moved outward with relation to said fixed member, said stop mechanism will automatically move to a position which prevents a return movement of said slide member in relation to said fixed member, and a spring friction or retarding member connected with said fixed member which engages said slide member to prevent accidental movement of the slide member with relation to the fixed member, but which yields to the positive actuation of the engaging member of the connecting rod.

In testimony whereof I affix my signature.

F. DEWEY EVERETT.